INVENTOR.
John T. Pennington
BY
ATTORNEYS

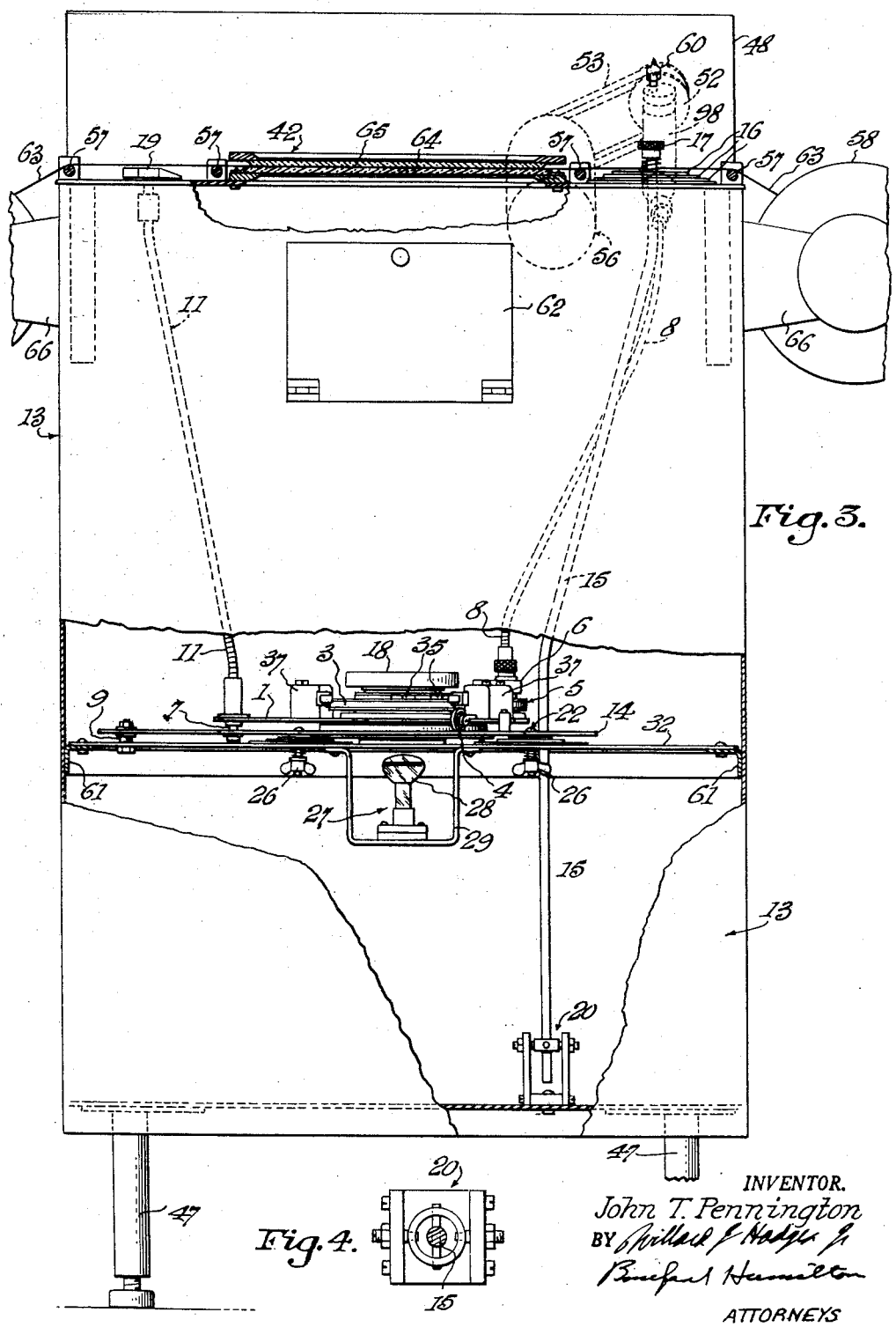

INVENTOR.
John T. Pennington

Nov. 18, 1958  J. T. PENNINGTON  2,860,561
PHOTOGRAPHIC PRINTER WITH A POINT LIGHT SOURCE
AND MECHANICAL DODGING DEVICE
Filed Aug. 9, 1957   11 Sheets-Sheet 5

INVENTOR.
John T. Pennington
BY
ATTORNEYS

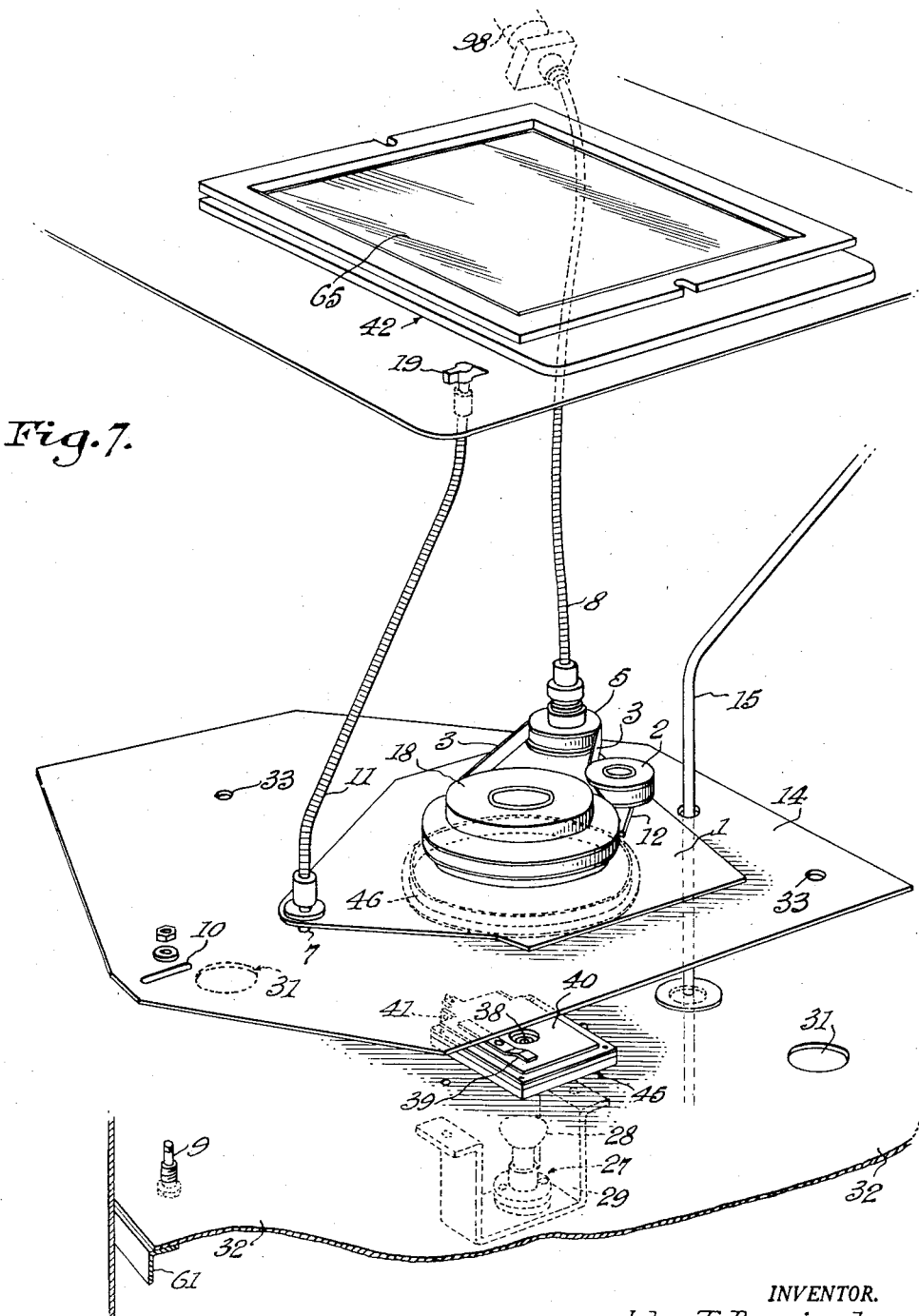

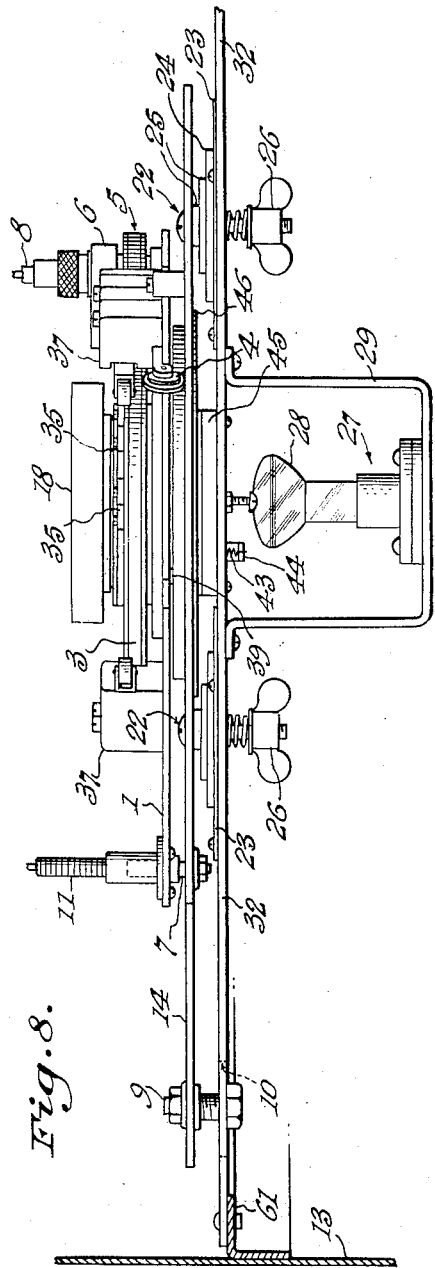
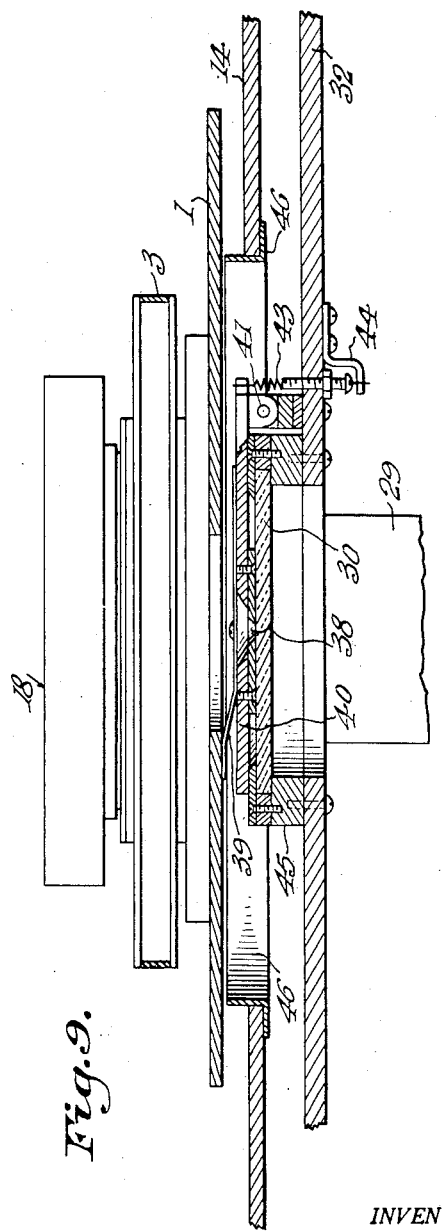

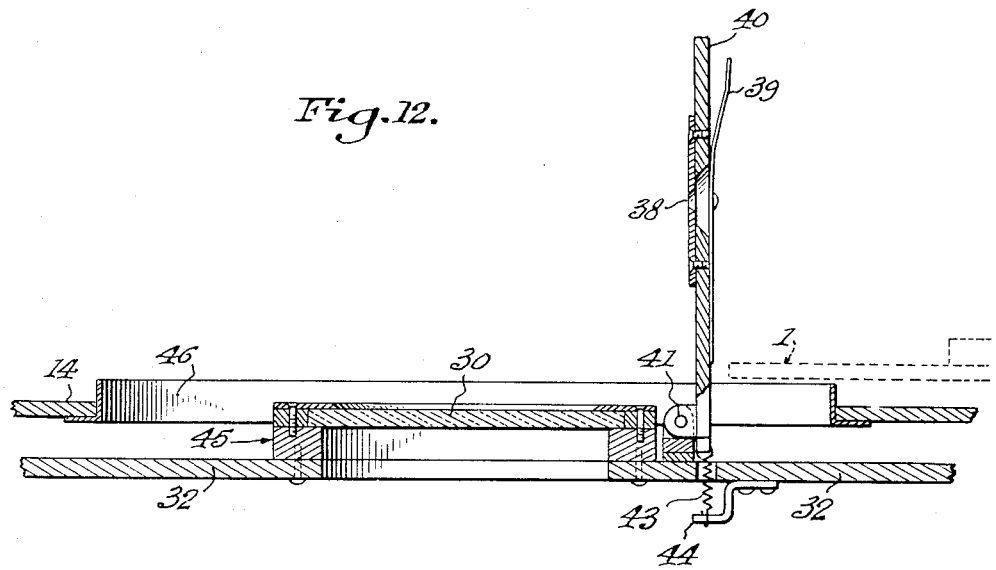
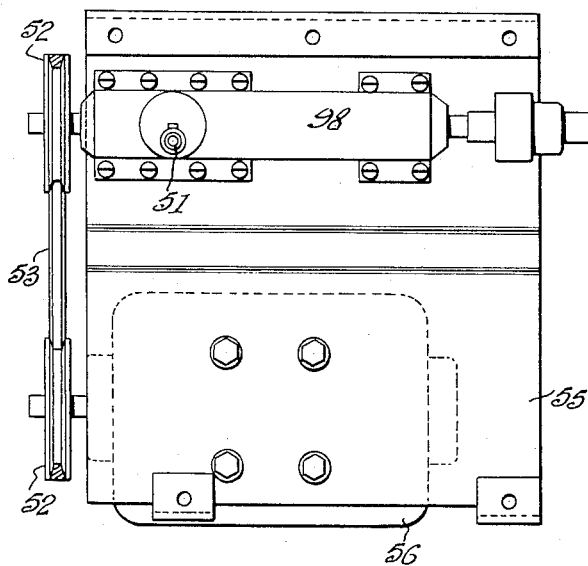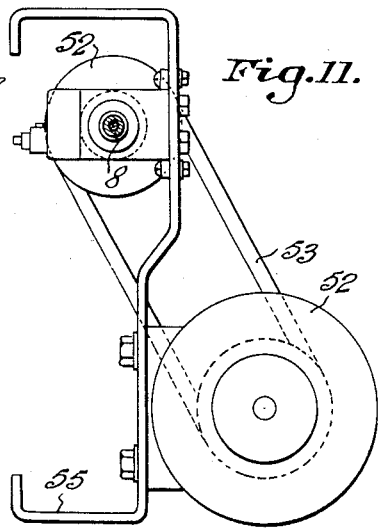

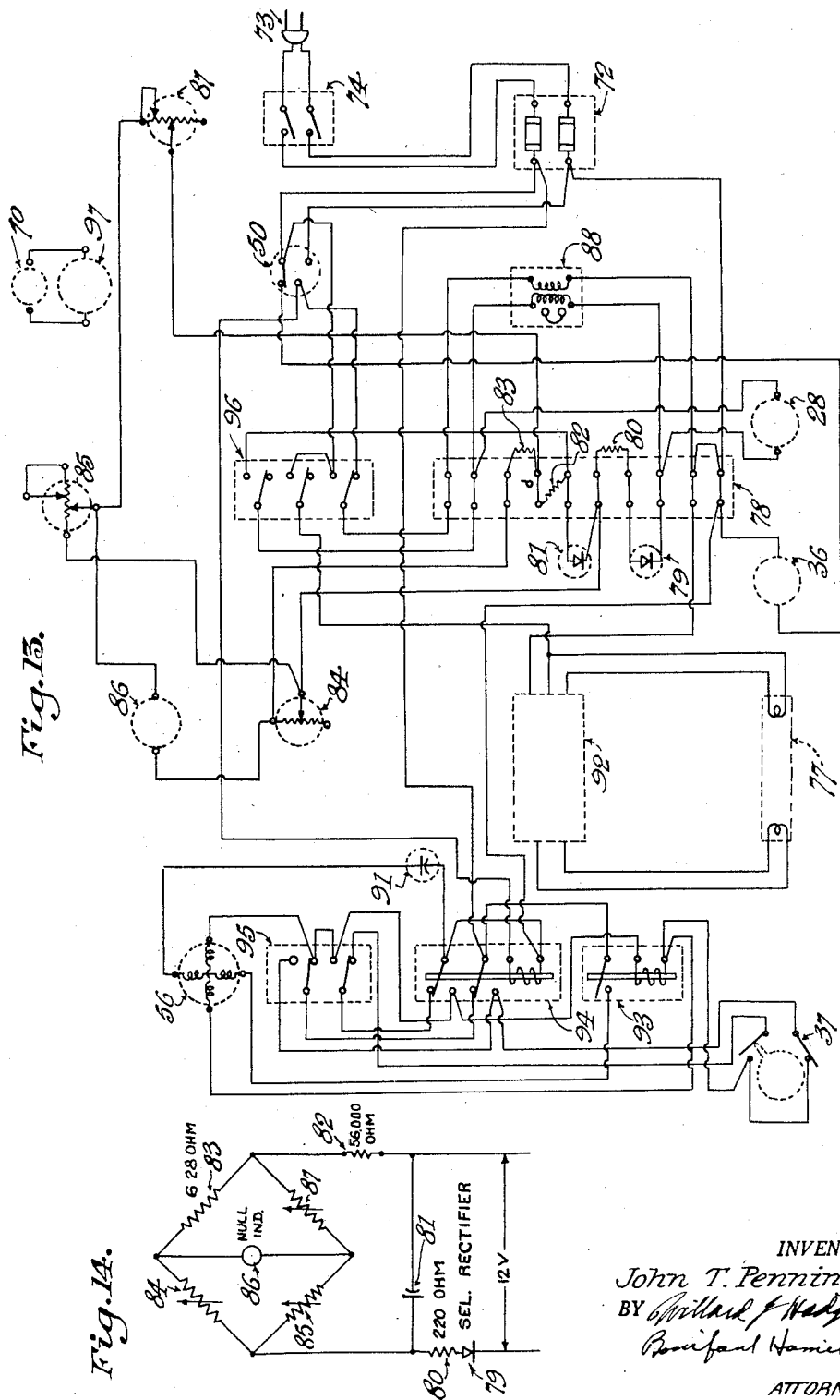

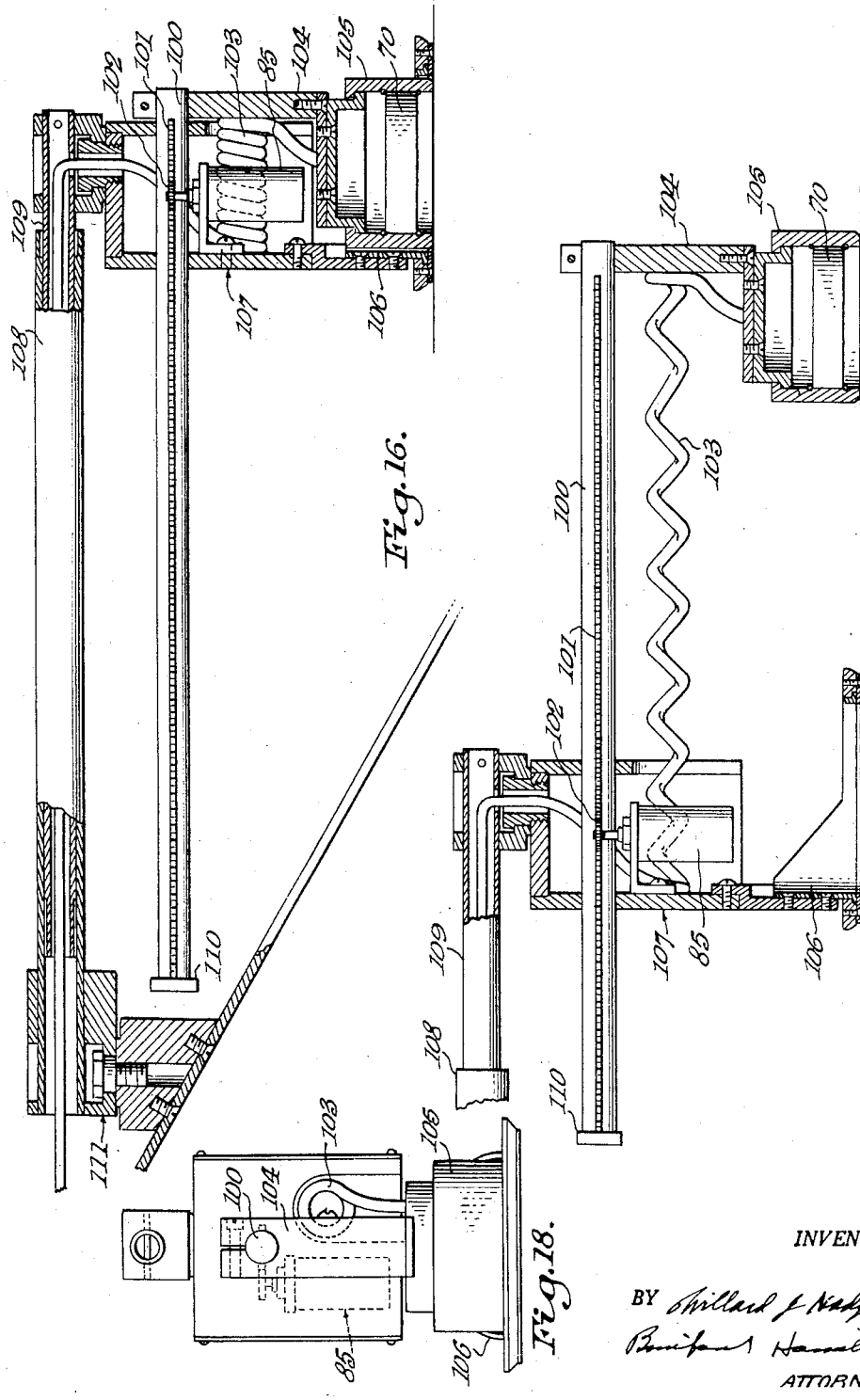

United States Patent Office

2,860,561
Patented Nov. 18, 1958

2,860,561

PHOTOGRAPHIC PRINTER WITH A POINT LIGHT SOURCE AND MECHANICAL DODGING DEVICE

John T. Pennington, Alexandria, Va., assignor to the United States of America as represented by the Secretary of the Army Application August 9, 1957, Serial No. 677,411

7 Claims. (Cl. 95—79)

(Granted under Title 35, U. S. Code (1952), sec. 266)

The invention described herein may be manufactured and used by or for the Government for governmental purposes without the payment of any royalty thereon.

This invention relates to photography, and more particularly, to photographic printing apparatus provided with a point light source and a mechanical dodging device.

The illumination on the negative in a camera decreases as the fourth power of the cosine of one-half of the field angle. Except for the vignetting effect of the lens mount, the illumination varies as $\cos^4 A$ where (A) is one-half the angular field. Ordinarily, this decrease in illumination is not noticeable but it is rather serious in wide angle aerial cameras. For example, if the half angular field of the aerial camera is 45°, the illumination at the edge of the negative will only be slightly in excess of 25% of what it is at the center. The loss due to vignetting would probably reduce this to only 15%. This uneven illumination makes it impossible to obtain an even exposure over the entire negative notwithstanding the considerable latitude of modern film emulsions. In actual practice, the center of the negative is intentionally overexposed in order to obtain a printable image on the edges. The resultant negative is usually densest near the center and concentrically becomes less dense away from such point. Actually, the center of density is partially dependent on the haze and the angular attitude of the sun. As the angular attitude of the sun decreases, the center of density may shift away from the physical center. Printing of such negatives without dodging of any kind results in prints having overexposed edges and an underexposed center. Aerial photographs taken for map use or reconnaissance use are next to worthless if good definition is not secured throughout the entire print. Ways have been devised to overcome this concentric fall-off in illumination. These include improvements in the camera itself which are of considerable interest in this connection. The uneven illumination of the plate is overcome by means of an auxiliary field stop in the shape of a star. About one-sixth of the total exposure is made with the stop out of the way. The stop is then swung into a position just in front of the lens and is kept rotating during the remainder of the exposure by means of a blast of air directed against the fan-shaped ends of the points. Another means of overcoming this problem has been the use of a variable density camera filter (dense in center) which reduces this uneven illumination. However, where the negative has been exposed without the use of these camera aids the attempt to rectify this uneven illumination in the printing stage has, up to now, been generally unsatisfactory. These attempts include using a battery of exposure lights and cutting off those around the edges and the use of hand-held dodging devices, etc. These methods in the main are slow and do not produce optimum results.

It is an object of this invention to provide a photographic printer using a point light source and a mechanical dodging device to obtain photographic prints and plates with good definition and contrast throughout their entirety from an aerial negative or the like whose density falls off concentrically from any point on such negative.

It is a further object of this invention to determine quickly and accurately the exposure needed for aerial negatives or the like and to produce even optimum photographic plates and prints from the same.

It is another object of this invention to provide a mechanical dodging device in combination with a contact printer whereby even exposure of photographic prints and plates may be obtained from negatives having a concentric fall-off in density.

Still another object is to provide means by the use of which any number of identical prints or plates may be made from a particular negative without any danger of exposure or definition variance.

Referring to the drawings, which are made a part of this application, and wherein like reference characters denote like parts throughout—

Fig. 3 is a front elevation of the printer, parts being shown in section;

Fig. 4 is a detailed view of the base support joint assembly for the iris unit positioning lever;

Fig. 7 is a diagrammatic perspective view of the device showing the relationship of some of the more important portions;

Fig. 8 is an enlarged detailed elevation of a portion of the invention showing the diaphragm, the positioning and support plates, and the light assembly;

Fig. 9 is an enlarged sectional view showing the aperture whereby the point light source is obtained, and the iris diaphragm;

Fig. 10 is a plan view of the motor and manual speed control;

Fig. 11 is a side elevation of the view in Fig. 10;

Fig. 12 is a detailed section showing the point light source aperture in the open, or inspection, position;

Fig. 13 is the wiring diagram for the contact printer;

Fig. 14 is the schematic diagram of the Wheatstone bridge circuit employed to determine exposure time and rate of diaphragm opening or closing;

Fig. 16 is a vertical longitudinal section of the optional photocell arrangement;

Fig. 17 is a similar view to Fig. 16 showing the photocell in extended position; and Fig. 18 is an end elevation of the photocell arrangement.

Figure 1:
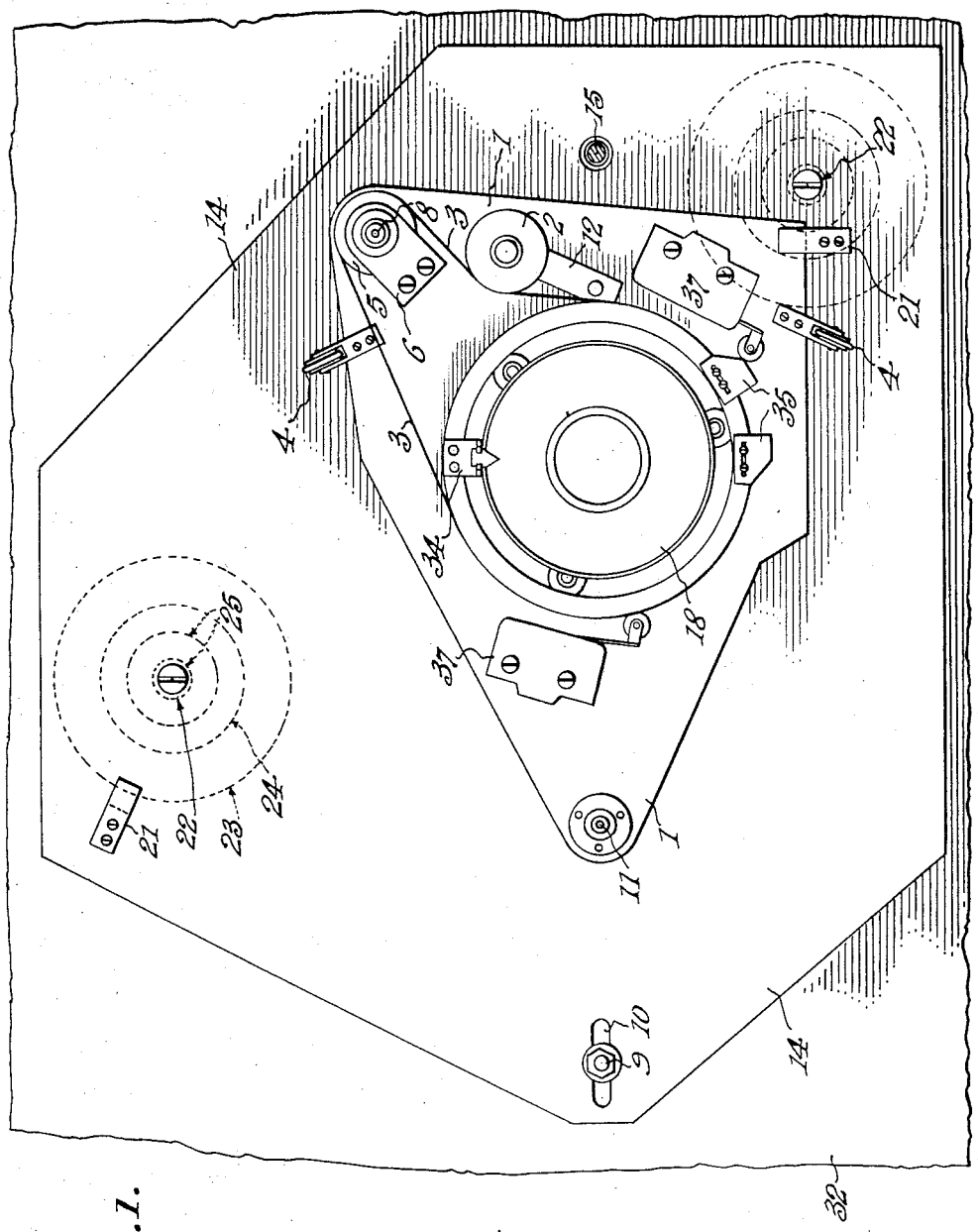
Fig. 1 is a plan view of a portion of the invention showing the iris diaphragm and position plates within the printer.

As shown in Fig. 3, this invention consists of a contact printer comprising a light-tight box or casing 13 supported on adjustable legs 47 and having a hood 48 upon which a control panel may be mounted. Located somewhat below the center of box 13 is a support plate 32 attached to 13 by means of brackets 61. A lamp assembly 27 consisting of lamp 28 is mounted centrally beneath support plate 32 by means of a bracket 29. Mounted on support plate 32 is the iris positioning plate 14 by means of a pivot 9 and supports 22. Mounted upon plate 14 is the iris unit pivot plate 1 by means of the iris unit pivot pin 7 and further supported by roller assemblies 4.

Directly above the lamp assembly 27 is the point light aperture 38 which is located within a light seal between plates 1 and 32 by means to be detailed later in connection with Fig. 9. Mounted upon plate 1 is a conventional iris diaphragm 18, micro-switch actuators 35, micro-switches 37 and cable means 8 and 11.

Cable means 11 terminate on top of box 13 in a control knob 19 while cable means 8 connect directly to the manual speed control 98 located beneath the hood 48. Passing through plates 14 and 32 is the iris unit positioning lever 15 which is connected to joint 20 at the base of box 13 and its upper end terminating in a control knob 17 through a series of light baffles 16. Near the top of box 13 is a hinged inspection plate 62.

Additionally mounted upon the top of box 13 is the printing stage 42, and film rollers 57. Attached to either side and near the top of box 13 are the film spools 58. The manual speed control knob 60 is shown to be located upon the exterior of hood 48.

Figure 5:
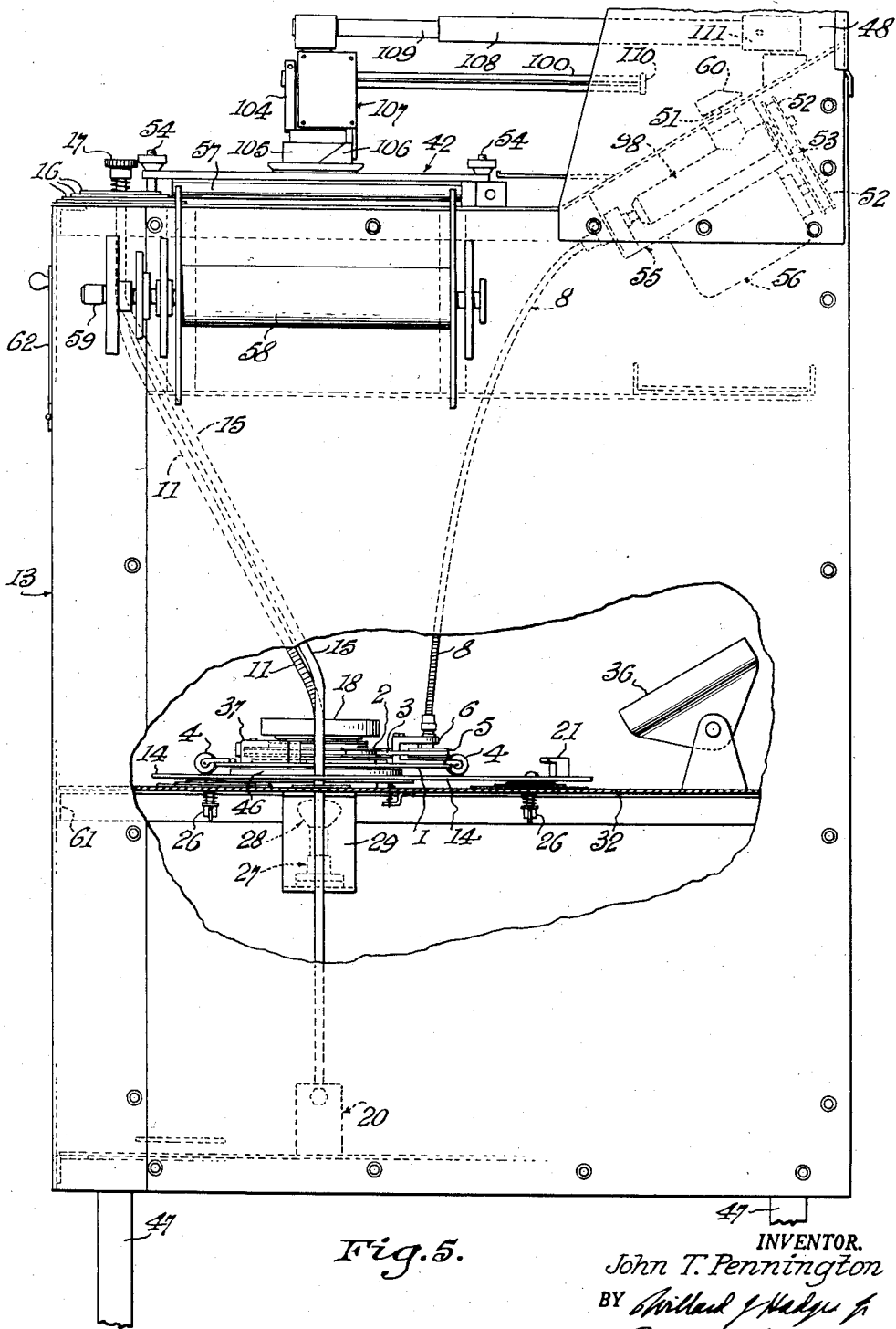
Fig. 5 is a side elevation of the printer, parts being shown in section.
Figure 6:
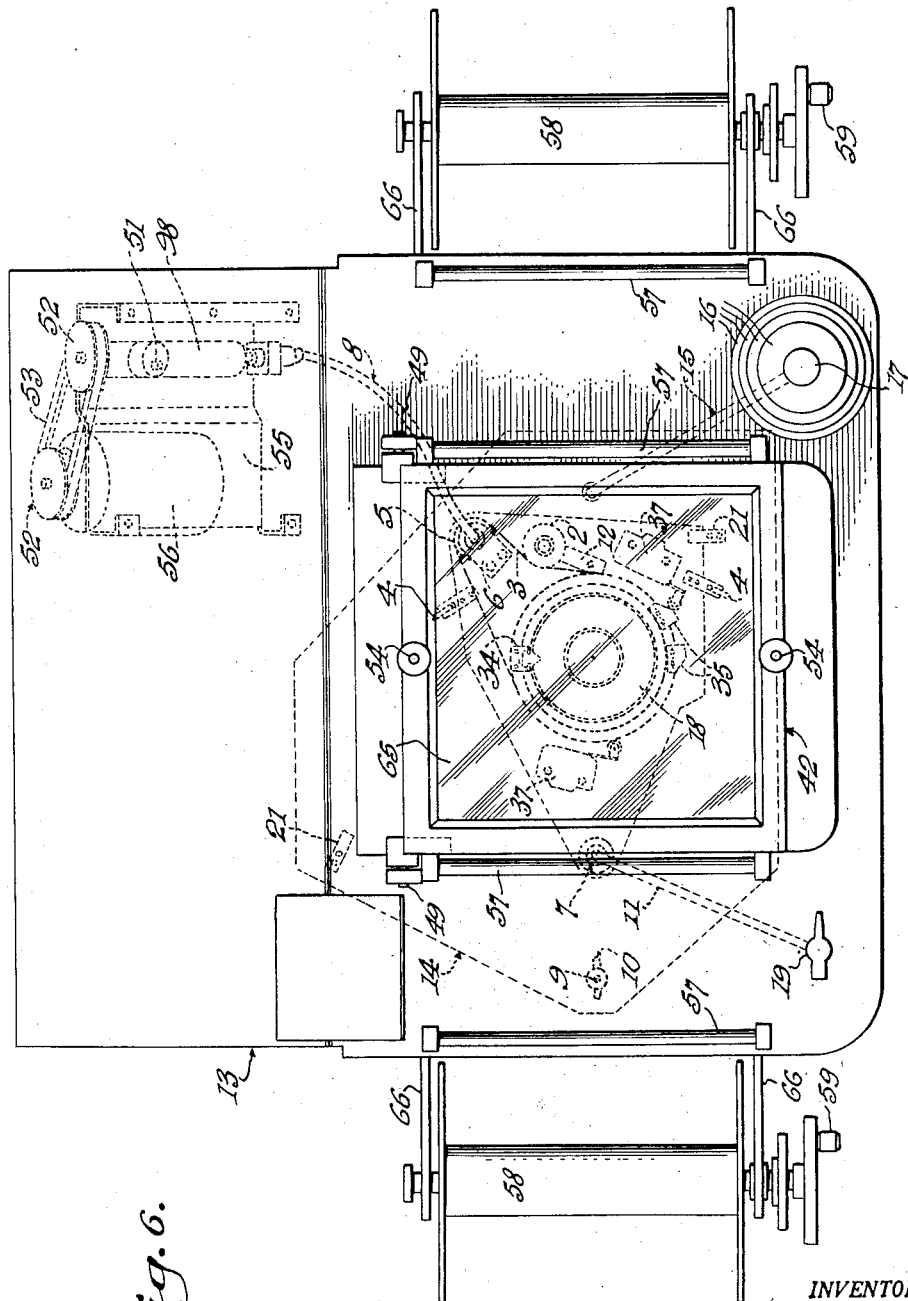
Fig. 6 is a plan view of the device.

Fig. 5, a side elevation of the printer, shows additionally a safe light 36 mounted upon plate 32 and reveals that the film spools 58 have handles 59 for manual operation of the film 63 through the printing stage 42. This section shows more clearly the relative positions of manual speed control 98 and the motor 56 connected by means of pulleys 52 and a belt 53. The manual speed control 98 is shown to have a control shaft 51 leading through the hood 48 and terminating in the control knob 60. Additionally, Fig. 6, a plan view of the printer, shows the printing stage 42 which is made up of glass plates 64 (see Fig. 3) and 65, clamp screws 54, hinges 49, and rollers 57.

Figure 2:
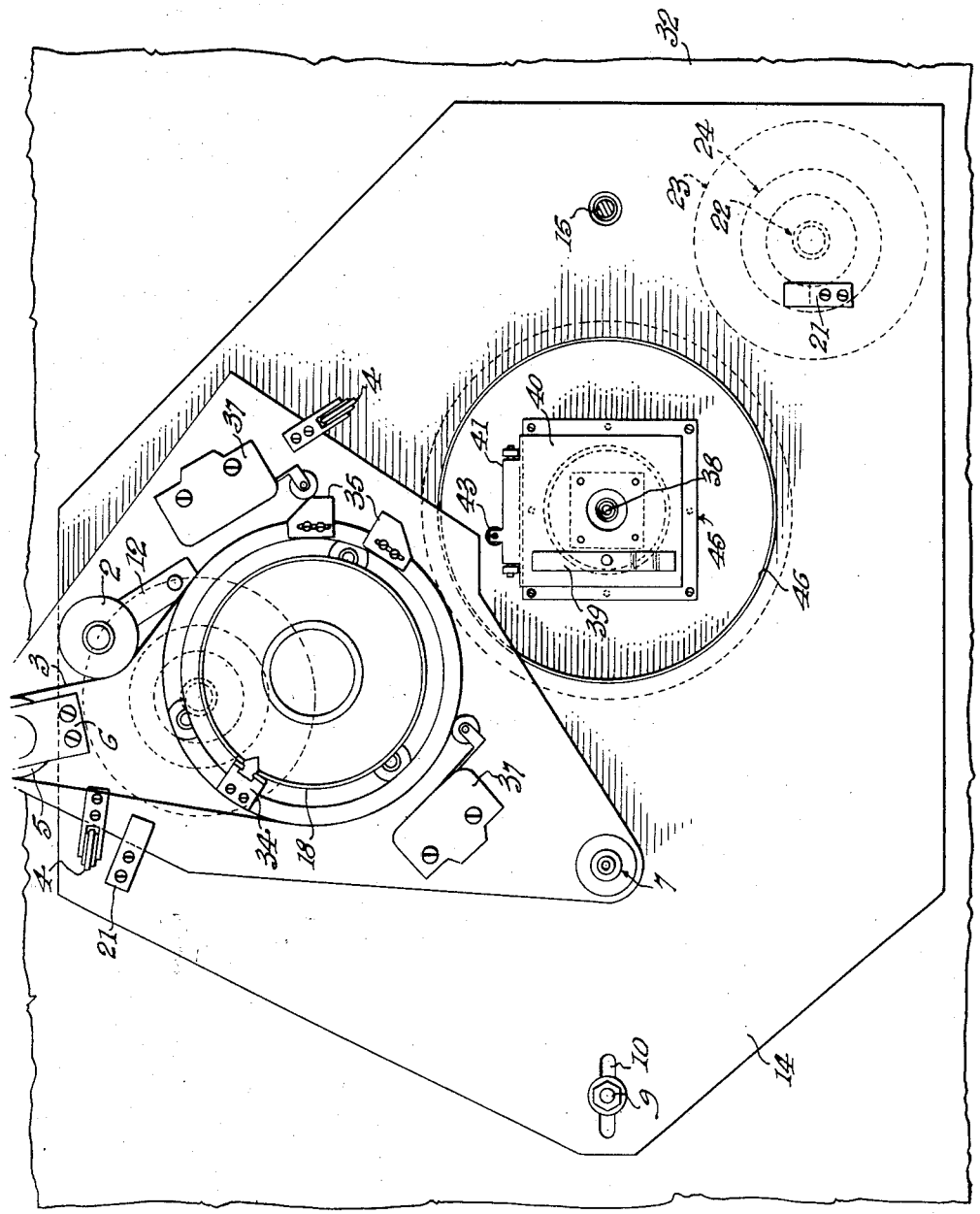
Fig. 2 is a view similar to Fig. 1, except that the iris diaphragm has been translated by means of iris unit pivot plate to show the point light aperture beneath.

Referring now to Figs. 1 and 2, iris diaphragm 18 with its iris actuator bracket 34 is shown to be mounted upon plate 1 and connected by means of pulley belt 3 to a pulley assembly 5. The iris is so adjusted as to close down no farther than one-eighth inch diameter. A roller assembly 2 mounted upon plate 1 by means of a pulley pivot arm 12 supplies the needed tension. Pulley assembly 5 connects to the flexible motor shaft 8, which is held in position by bracket 6 connected to plate 1. On either side of iris diaphragm 18 and connected with plate 1 are the micro-switches 37 which ride against the periphery of the diaphragm 18 by means of rollers. The switches 37 are actuated by limit switch actuators 35. The whole of plate 1 is translatable upon plate 14 by means of pivot pin 7 which is operated through flexible shaft 11 by control 19. Movement of control 19 causes plate 1 to travel to the right or left upon plate 14 by means of rollers 4 within the limits of two iris unit pivot plate stops 21. Also shown in Fig. 1 is the iris positioning plate pivot pin 9 which is contained within positioning slot 10. Plate 14 is additionally connected to support plate 32 by means of the supports 22.

Fig. 2 shows plate 1 rotated to the extreme left thereby exposing the frame for the aperture lid and the hinged aperture lid 40. In actual operation upon translating plate 1 to the left, as shown in Fig. 2, the aperture lid 40 would be lifted by the action of hinge 41 and hinge spring 43 allowing illumination from lamp 28 to come freely through the flashed opal glass 30 shown in Fig. 9. Upon translating plate 1 back to the right, the hinged aperture lid 40 would be closed and held down by means of plate 1 and tensioned spring 39.

Referring to Figs. 7, 9 and 12, the detailed operation of the hinged aperture is more clearly seen. As shown in Fig. 9, support plate 32 contains a centrally located opening around which is mounted the frame 45. Within this frame is recessed the flashed opal glass 30 and fitting over the inwardly directed flanges of frame 45 is the light aperture lid 40 which contains the light aperture 38. The lid 40 is fitted by means of hinge 41 and a spring 43 which connects to the underneath side of plate 32 by means of bracket 44. As shown in Fig. 9, plate 1 bears against the flat spring 39 to insure a tight fit. The whole of this portion fits in a circular opening in the plate 14 which opening is light sealed by flanged ring 46. The light aperture 38 fits beneath a circular hole in plate 1, upon which in turn is superimposed the iris diaphragm 18. The diagrammatic perspective, Fig. 7, shows the relative superimposition of the light assembly, plate 32, the light aperture assembly, plate 14, plate 1, and the iris diaphragm, in their ascending order. Fig. 12 shows the light aperture lid 40 in the open position after plate 1 has been translated.

Referring to Fig. 7, it is seen that movement of flexible shaft 8 will open or close iris diaphragm 18 through the pulley 5 and cable 3.

As shown in Fig. 1, rotation through one complete cycle of the diaphragm (i. e., from open to closed) will actuate micro-switches 37 at the beginning and the end of the cycle through the limit switch actuators 35.

Figs. 10 and 11 show the relative position of the motor 56 and a conventional, mechanically operated manual speed control 98. They are mounted under the hood 48 by means of bracket 55 and connected through pulley means 52 and 53. In turn, the manual speed control connects through flexible motor shaft 8 to control the speed of opening and closing of the iris diaphragm unit 18.

Referring now to Fig. 8, the iris positioning plate pivot pin 9 connects plate 14 to support plate 32. As shown in Fig. 1, the connection is made through slot 10 in plate 14 which allows movement of plate 14 through the length of slot 10. Plate 14 additionally connects to support plate 32 by means of supports 22. Each support 22 consists of a threaded screw which fits through plate 14 by means of a fitted hole 33 (see Fig. 7). As shown in detail in Fig. 8, fitted on 22 between plates 14 and 32 are spacers 25, friction disc 24 and wear plates 23. On the underneath side of plate 32, 22 is held by wing nut assembly 26. Each support 22 fits to plate 32 through the larger holes 31. It can be seen, therefore, by reference to Fig. 7, that movement of the iris unit positioning lever 15 will allow plate 14 to move circularly within the limits of holes 31 by virtue of the lever 15 bearing against the opening in the plate 14 through which it passes.

Fig. 13 shows the wiring diagram for the contact printer including the Wheatstone bridge circuit which can be used to calculate the rate of closure of the iris diaphragm 18 in inches per second. The power inlet is at plug 73, and is fed through start switch 74 and fuse block 72. A photoelectric cell 70 can be used to measure the densities of the film. It is connected directly to a microammeter 97 which is calibrated to read in seconds of exposure time. Reference 37 is the iris limit switches, 28 is the printing lamp, 36 is the safelight, 77 is a fluorescent lamp (15 watt T-8), 78 is the terminal strip, 79 is a selenium rectifier (Mallory #65100A (130 v./100 ma.)), 80 is a 220 ohm fixed resistor, 81 is a capacitor (Mallory # WPO 63 (4 mfd. 50 v.)), 82 is a 56,000 ohm fixed resistor, 83 is a 628 ohm fixed resistor, 84 is a potentiometer, 85 is a potentiometer, 86 is a null indicator, 87 is a potentiometer, 88 is a transformer, 115 v.–12 v. Parts 79 to 88 are all used in the Wheatstone bridge circuit to calculate the rate of closure of the iris diaphragm 18 and are also shown in the schematic diagram, Fig. 14. The other listed parts of the wiring diagram include the timer 50, the motor 56, the motor capacitor 91, the trigger start ballast 92 for the fluorescent lamp 77, a single-pull single-throw relay 93, a double-pull, double-throw relay 94 and switches 95 and 96.

Figure 15:
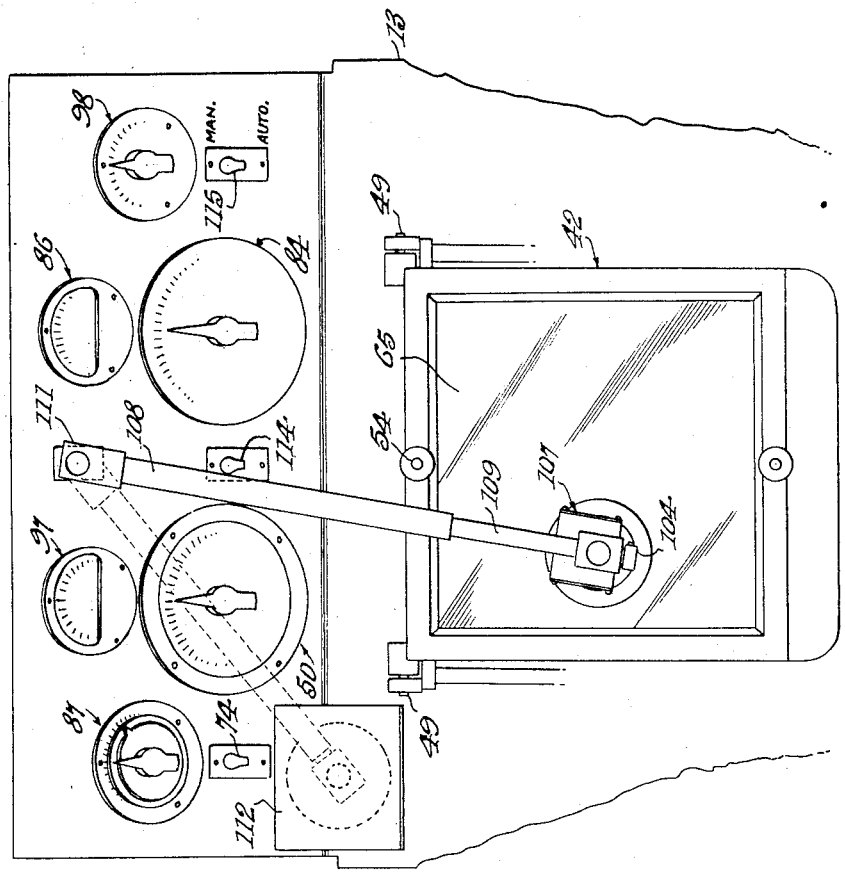
Fig. 15 is a plan view showing the instrument panel and photocell arrangement which can be used to determine densities and rate of closure.

Fig. 15 shows the instrument panel and photoelectric cell arrangement which is in effect an additional embodiment which can be used to measure the densities of the film and calculate the rate of closure. The panel shows the settings and readings for the various potentiometers, timer and switches already shown in the wiring diagram. As shown, 87 is the potentiometer whereby the readings T and t may be set into the Wheatstone bridge to obtain T—t. Microammeter 97 is hooked up to the photoelectric cell 70 to give readings in seconds of exposure time. Timer 50 sets the overall exposure time. Potentiometer 84 sets the dodging rate. The null indicator is shown at 86. The setting for the manual speed control is made with dial 98. The photoelectric cell 70 operates off an arm 108 which is attached to the printer by swivel arrangement 111 as shown in Fig. 16. A telescoping extension 109 fits within 108 and connects to the casing 107. When not in use the cell 70 rests on support 112, see Fig. 15. The switches shown are the "on-off" switch 74, the printing lamp switch 114 and the "manual-automatic" switch 115.

Fig. 16 shows the photoelectric cell arrangement in greater detail. The swivel arrangement 111 holds the arm 108, allowing it to swing in an arc. The telescoping arm 109 fits within 108 and connects to casing 107. Casing 107 encompasses the potentiometer 85, the coiled wire 103 and has an opening through which arm 100 fits. The wire leads into the cell 70 which is encased in cell housings 105 and 106, the latter being connected to casing 107 and detachable from the photoelectric cell. The arm 100 has a rack 101 which meshes with gear 102, setting in a resistance in potentiometer 85 depending on the distance travelled. The arm 100 has a stop 110 which limits the movement of the arm through the casing 107. The arm connects to the photoelectric cell support arm 104.

As shown in Fig. 17, the photoelectric cell 70 may be disengaged from cell housing 106 and moved away from casing 107. As it is moved, the coiled wire 103 extends, the telescoping arm 109 extends, and the arm 100 moves toward its limiting stop 110. This rotates gear 102 along rack 101, adjusting potentiometer 85 to a resistance proportional to the distance moved.

Now referring to the operation of this invention, the film 63 is loaded on one of the film spools 58 which is attached to the box 13 by means of bracket 66. It is then fed over the smooth surface returning film rollers 57 which are provided on each side of the printer to guide the film and to prevent scratching the emulsion of the negative. The film then is positioned between glass plates 64 and 65 by opening the printing stage 42 and then clamping it together with screws 54. This plate for the printing stage should be of clear glass, free of objectionable scratches, striae, and bubbles in an unobstructable area at least as large as the negative to be printed. At this point the printing light 28 should be switched on and the iris unit pivot plate should be turned to the left by means of control knob 19 thereby permitting the light aperture lid 40 to spring open and allow unrestricted light from the lamp 28 through the printing stage for visual inspection of the negative. Determination of the point of greatest density is noted at this time. The exposure time for the densest portion of the negative (T) and the thinnest portion of the negative (t) is now determined. This may be done by visual inspection or by means of the photoelectric cell circuit calibrated to give readings in seconds of exposure. The distance between T and t is then measured in inches on the negative. This is called R. From these figures and using the formula $$V = \frac{R}{T-t}$$

the rate of opening of the iris diaphragm can readily be determined in inches per second. For example, if T is 20 seconds, and t is 10 seconds and R is 5 inches, the rate of opening equals $$\frac{5}{20-10}$$

or ½ inch per second. The manual speed control 98 is then set for this calculated rate of opening.

The timer 50 is then set to the desired total exposure interval. Plate 1 is translated back, closing the light aperture lid 40. The printing light which is preferably an incandescent lamp will then shine through the aperture 38. The diameter of the projected cone of light reaching the stage plate with iris diaphragm open and in extreme lateral position should be at least as large as the diagonal of the negative to be printed. The intensity of the light source should be such that the exposure time for negatives of average density is approximately 20 seconds, when printing on aerographic Positive Plates (Contrast). The center of the projected cone of light with iris diaphragm in closed position is then coincided with the center of greatest density of the negative. This is accomplished by moving control 17 which in turn moves the iris positioning plate 14 by means of shaft 15. The printing light 28 is then turned off and the medium to be exposed is placed in contact with the film 63 and the exposure cycle is started by actuating the start switch 74 to "on," the printing light switch 114 is turned on and the switch 115 to "automatic." This actuates the iris motor 56 and the timer 50 and turns on the printing lamp 28. The iris 18 begins to open and continues to open at the pre-set speed until full open position is reached. At this point the iris limit switch 37 breaks the motor circuit and stops the iris in full open position. The printing lamp continues on until the pre-set time on the timer 50 has expired, at which point the printing lamp is cut off automatically and the iris diaphragm closing circuit is actuated returning the iris to its maximum closed position. When this position is reached the iris diaphragm limit switch is tripped, stopping the motor drive. The printer is then ready for a second cycle as described above.

Where the photoelectric cell arrangement and the Wheatstone bridge circuit are preferably utilized to calculate the rate of opening, the equipment shown mainly in Figs. 15 through 18 and in the wiring diagram 14 may be used. The photoelectric cell 70 is first placed over the center of greatest density of the negative. This produces a reading (T) in seconds of exposure time on the microammeter 97. This reading is then put into potentiometer 87. The cell is then placed over the center of thinnest density and that reading (t) is produced on the microammeter. This reading is also put into potentiometer 87 which then reflects a resistance equivalent to T−t.

As the photoelectric cell was moved from T to t, the ratchet gear 102 moved along the ratchet 101, and put a resistance into potentiometer 85 equivalent to R, in inches, in the equation $$V = \frac{R}{T-t}$$

Looking now at the schematic diagram of the Wheatstone bridge circuit (Fig. 14) it is seen that the potentiometers R (85) and T−t (87) are on opposite sides of the bridge. The unbalance is reflected in null indicator 86. This is reduced to zero by turning potentiometer 84 (the dodging rate) the necessary amount. The reading thus obtained on 84 is V or the rate of opening in inches per second. This reading is set into the manual speed control 98 and operation of the cycle as previously described may commence.

Having thus described my invention, what I claim as new and wish to secure by Letters Patent is:

1. A photographic printer for negatives, the densities of which radially decrease from a point on said negatives, comprising a casing including a base, a printing stage thereon, a point light source within said casing directing a cone of light towards said printing stage, said cone of light having a diameter at its intersection with said printing stage at least as large as the diagonal of said printing stage, an iris diaphragm positioned between the said light source and the printing stage, drive means to open and close said iris diaphragm at a pre-set rate of speed, timer means for pre-setting the overall time of exposure, and means for positioning the said iris diaphragm laterally in two directions in a plane parallel to the printing stage in the cone of light from the said point light source.

2. A photographic printer as claimed in claim 1, wherein the means for positioning said iris diaphragm laterally in two directions in a plane parallel to the cone of light from said point light source comprise an iris diaphragm positioning plate, a support plate, said iris diaphragm positioning plate pivotally mounted upon said support plate by means of a pin fitting through a longitudinal slot in said positioning plate, the two plates further connected by a plurality of pins fitting snugly through said positioning plate and through larger holes in said support plate, and a positioning lever comprising control means externally of said casing, a rod fitting through said positioning plate and support plate and swivelly-connected to the base of said casing.

3. A photographic printer as claimed in claim 2, wherein the iris diaphragm is attached pivotally to an iris unit pivot plate, said plate juxtapositioned intermediately of the iris diaphragm and the iris diaphragm positioning plate and having rollers adapted to ride along said positioning plate and means having controls external of the casing to translate said pivot plate.

4. A photographic printer as claimed in claim 3, wherein the point light source comprises a printing lamp, and a tensioned, upwardly opening door having a light aperture directly over said lamp, said door being held in position by the said iris unit pivot plate when said plate is juxtaposed over said door.

5. A photographic printer for negatives the densities of which radially decrease from a point on said negatives, comprising a casing, a printing stage thereon, a point light source within said casing, an iris diaphragm positioned between the said light source and the printing stage, means to open and close said iria diaphragm at a pre-set rate of speed, said means including drive means, variable speed means connected to said drive means, said variable speed means having variable controls external of said casing, a shaft leading from said externally-located variable controls, pulley means, said shaft connected to said pulley means, and said pulley means further connected to the iris diaphragm.

6. A photographic printer as claimed in claim 5, having means for positioning the said diaphragm laterally in two directions in a plane parallel to the printing stage in the cone of light from the said point light source.

7. A photographic printer as claimed in claim 6, having switch means mechanically operated by the rotation of the iris diaphragm to reverse said motor means at the open and closed positions of said iris diaphragm.

References Cited in the file of this patent

UNITED STATES PATENTS

| | | |
|---|---|---|
| 1,084,687 | Wing | Jan. 20, 1914 |
| 2,553,421 | Monsen | May 15, 1951 |
| 2,570,888 | Urie | Oct. 9, 1951 |